United States Patent
Severson

(10) Patent No.: US 7,255,009 B1
(45) Date of Patent: Aug. 14, 2007

(54) VARIABLE ANALOG OUTPUT PRESSURE SWITCH

(75) Inventor: Steve Severson, Pompano Beach, FL (US)

(73) Assignee: Micro Pneumatic Logic, Inc., Pompano Beach, FL (US)

( * ) Notice: Subject to any disclaimer, the term of this patent is extended or adjusted under 35 U.S.C. 154(b) by 0 days.

(21) Appl. No.: 11/390,845

(22) Filed: Mar. 27, 2006

(51) Int. Cl.
*G01L 9/00* (2006.01)
(52) U.S. Cl. ......................................................... 73/705
(58) Field of Classification Search .................... 73/705
See application file for complete search history.

(56) References Cited

U.S. PATENT DOCUMENTS

| | | | |
|---|---|---|---|
| 4,004,272 A | 1/1977 | Claxton et al. | |
| 4,521,683 A | 6/1985 | Miller | |
| 4,581,941 A | 4/1986 | Obermann et al. | |
| 4,607,161 A * | 8/1986 | Anderson et al. | 250/227.21 |
| 6,089,098 A | 7/2000 | Tylisz et al. | |
| 6,154,586 A | 11/2000 | MacDonald et al. | |
| 6,870,966 B1 * | 3/2005 | Silverbrook et al. | 382/313 |
| 6,980,704 B2 * | 12/2005 | Kia et al. | 382/314 |
| 2007/0014490 A1 * | 1/2007 | Silverbrook et al. | 382/313 |

* cited by examiner

*Primary Examiner*—Andre J. Allen
(74) *Attorney, Agent, or Firm*—Cooper & Dunham LLP

(57) ABSTRACT

A variable analog output pressure switch having a diaphragm attached to a plunger, the plunger controlling the amount of light detected by a photocell or photodetector, the photocell or photodetector outputting voltage roughly proportional to an applied pressure on the diaphragm.

13 Claims, 3 Drawing Sheets

VARIABLE ANALOG OUTPUT PRESSURE SWITCH

TECHNICAL FIELD

This invention relates generally to a pressure switch and, more particularly, to a pressure switch which outputs a variable analog signal.

BACKGROUND

A pressure switch is a type of switch in which the switching action is triggered by pressure in the surrounding environment. Pressure switches have been proposed for use in various kinds of electro-mechanical devices. A typical pressure switch has a diaphragm that is impinged upon by media, such as air under pressure, and upon reaching a particular pressure the diaphragm causes the switch contacts of the pressure switch to be actuated from the off-to-on or on-to-off position by snap action, creating a binary type output.

However, in many instances, such as in modern control systems, it is desirable to utilize a switch that provides an analog output such that the output varies according to applied pressure or vacuum. Conventional pressure switches do not meet this need because snap action actuation of the conventional switches causes a binary signal to be output instead of an analog signal. For example, snap action actuation from the off-to-on or on-to-off position does not allow for an output that is approximately proportional to applied pressure or vacuum.

SUMMARY

The present disclosure provides examples of pressure switches which output a variable analog signal instead of a binary signal, such that the output varies according to applied pressure or vacuum. Such pressure switch devices can be integrated with an additional mechanism within the switch which actuates a discrete switch that provides a binary output, in addition to the variable analog output provided by the switch.

In accordance with one aspect of the present disclosure, a variable analog pressure switch is provided in which an optical mechanism is actuated in response to pressure, instead of a snap action mechanism.

In one example, the analog output provided by the switch varies according to light detected by a photodetector in the optical mechanism. The optical mechanism in the example includes a shutter-like device which gradually cuts off light supplied in the direction of the detector, in response to pressure in the surrounding environment. The photodetector provides an output (for example, a voltage) which varies according to an amount of light detected by the photodetector (for example, linearly or otherwise monotonically)

BRIEF DESCRIPTION OF THE DRAWINGS

The features of the present disclosure can be more readily understood from the detailed description below with reference to the accompanying drawings wherein.

DETAILED DESCRIPTION

In describing examples and preferred embodiments in connection with the drawings, specific terminology is employed for the sake of clarity. However, the disclosure of this patent specification is not intended to be limited to the specific terminology so selected, and it is to be understood that each specific element includes all technical equivalents that operate in a similar manner.

Figure 1:
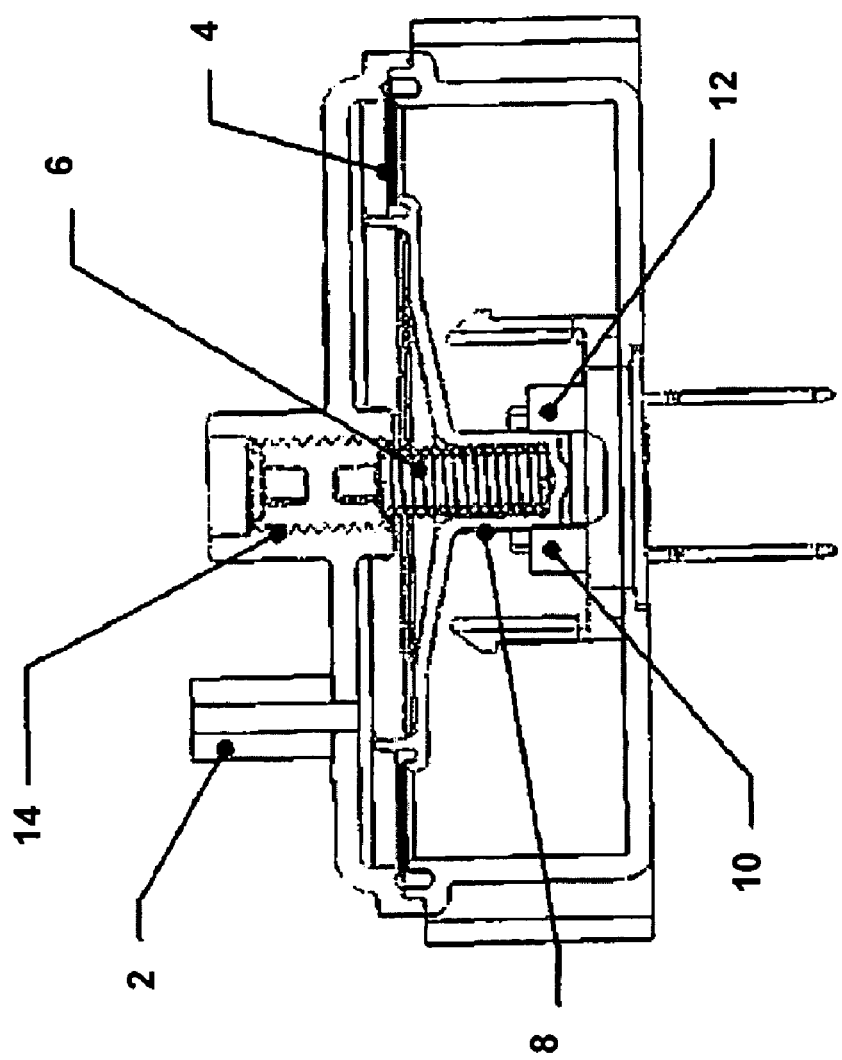
FIG. 1 is a cross-sectional view of a variable analog output pressure switch according to an example of the present disclosure.

Referring now to FIG. 1, an example of a pressure switch 100 with an optical mechanism will be discussed. Electrical switching of the pressure switch 100 occurs when a fluid (such as air) enters a pressure port 2 and exerts pressure or force on a diaphragm 4. The diaphragm 4 is coupled to a plunger 8. The plunger 8 is abutted on an inner surface thereof by a spring 6. The spring 6 creates a spring force against the plunger 8 that is controlled by a threaded screw 14. The threaded screw 14 may be adjusted such that the spring force is increased or decreased depending on the desired pressure at which the pressure switch 100 is to respond. Thus, generally the plunger will move in a direction from the diaphragm towards the spring (that is, depressed) when the force translated through the diaphragm exceeds the spring force.

A light emitting diode (LED) 10 and a photodetector 12 are positioned relative to each other on opposite sides of the plunger 8 such that the photodetector 12 detects an amount of light from the LED 10. The photodetector 12 supplies an output according to an amount of light the photodetector 12 detects. The pressure switch 100 is in a non-activated state when the plunger 8 is not depressed, allowing the light from the LED 10 to be completely transmitted to the photodetector 12. When force is exerted on the diaphragm 4, the plunger 8 acts as a shutter and gradually moves to block the light generated by the LED 10 from reaching the photodetector 12 as it is depressed. Thus, the pressure switch 100 can output a variable voltage based on an amount of light detected by the photodetector 12.

Another example (FIG. 2) of a pressure switch with optical mechanism will now be discussed. Electrical switching of pressure switch 200 occurs from pressure created from a fluid (such as air) entering pressure port 22 which channels the fluid to exert a force on a diaphragm 24. The diaphragm 24 is coupled to a plunger 28. The plunger 28 is abutted on an inner surface thereof by a spring 26. The spring 26 creates a spring force against the plunger 28 that is controlled by a threaded screw 34. The threaded screw 34 may be adjusted such that the spring force is increased or decreased depending on the desired pressure at which the pressure switch 200 is to respond.

A photocell 30 is placed in close proximity to the plunger 28 such that a shutter 32, attached to the plunger 28, is capable of gradually blocking light from a light source (not shown) to the photocell 30 as the plunger 28 is depressed. The pressure switch 200 is in a non-activated state when the plunger 28 is not depressed, allowing light to be completely transmitted to the photocell 30. When force is exerted on the diaphragm 24, the plunger 28 is depressed causing the spring 26 to compress and the shutter 32 to gradually block light transmission to the photocell 30. The pressure switch 200 supplies a variable output based on an amount of light detected by the photocell 30.

The plunger 28 is abutted on an outer surface thereof by a spring 36. The spring 36 creates a spring force against the plunger 28 on the outer surface thereof. As pressure is decreased on the diaphragm 24, the spring 36 acts as deactuation means by exerting its spring force on the outer surface of the plunger 28. As the plunger 28 is forced against the spring 36, the shutter 32 allows more light to reach the photocell 30, and thus, the pressure switch 200 returns to a deactuated state.

Figure 3:
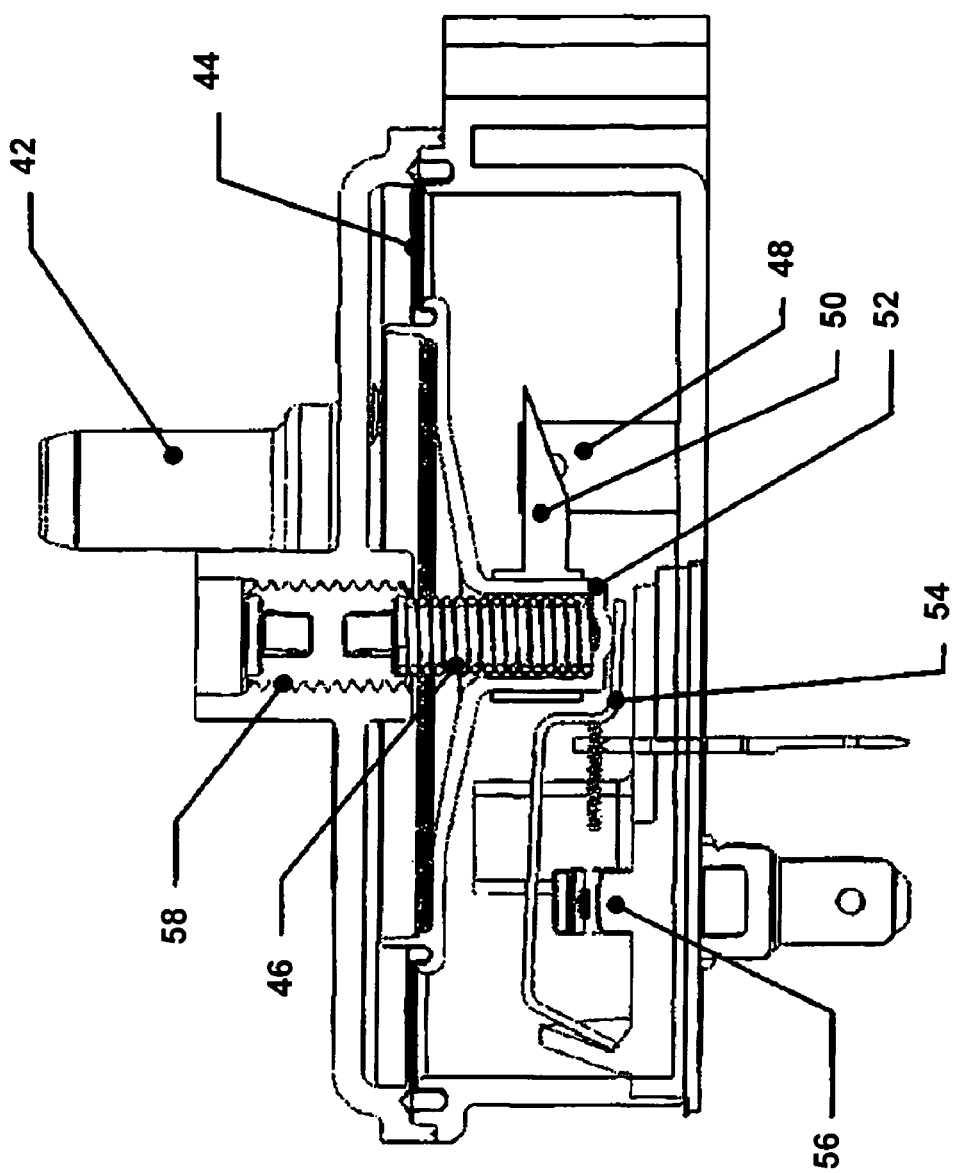
FIG. 3 is a cross-sectional view of a variable analog output pressure switch according to yet another example of the present disclosure.

Referring now to FIG. 3, another example of a pressure switch with optical mechanism will be discussed. Electrical switching of a pressure switch 300 occurs when pressure created from a fluid entering a pressure port 42 exceeds a certain level and exerts a corresponding force on a diaphragm 44. The diaphragm 44 is affixed to a plunger 52. The plunger 52 is abutted on an inner surface thereof by a spring 46. The spring 46 creates a spring force against the plunger 52 which is controlled by a threaded screw 58. The threaded screw 58 may be adjusted such that the spring force is increased or decreased depending on the desired pressure at which the pressure switch 300 is to respond.

A photocell 48 is placed in close proximity to the plunger 52 such that a shutter 50, attached to the plunger 52, is capable of blocking light to the photocell 48 as the plunger 52 is depressed. The pressure switch 300 is in a non-activated state when the plunger 52 is not depressed, allowing light to be completely transmitted to the photocell 48. When force is exerted on the diaphragm 44, the plunger 52 is depressed causing the shutter 50 to gradually block light transmission from the photocell 48. The pressure switch 300 supplies a variable analog output based on an amount of light detected by the photocell 48.

The plunger 52 is abutted on an outer surface thereof by an actuator 54 for a discrete switch 56. When the plunger 52 is not fully depressed, the actuator 54 is not activated and the discrete switch 56 is in an off position (or, alternatively, an on position). When the plunger 52 is fully depressed, the actuator 54 activates the discrete switch 56 to an on position (or, alternatively, an off position). When activated, the discrete switch 56 outputs a binary signal. By integrating the discrete switch 56 into the pressure switch 300, a user has the dual functionality of supplying analog and binary outputs.

It should be understood that the discussion above is merely illustrative for the purpose of demonstrating exemplary embodiments of a pressure switch with optical mechanism.

For example, while an LED is used in one exemplary embodiment, other well-known light sources (for example, laser diodes, photodiodes, etc.) can alternatively be used. Similarly, while a photocell may be used as a proposed photodetector, other light detection devices, such as phototransistors, etc., can be used instead. Further, it should be apparent that a pressure responsive actuation mechanism other than those shown in FIGS. 1-3 can be used alternatively.

Figure 2:
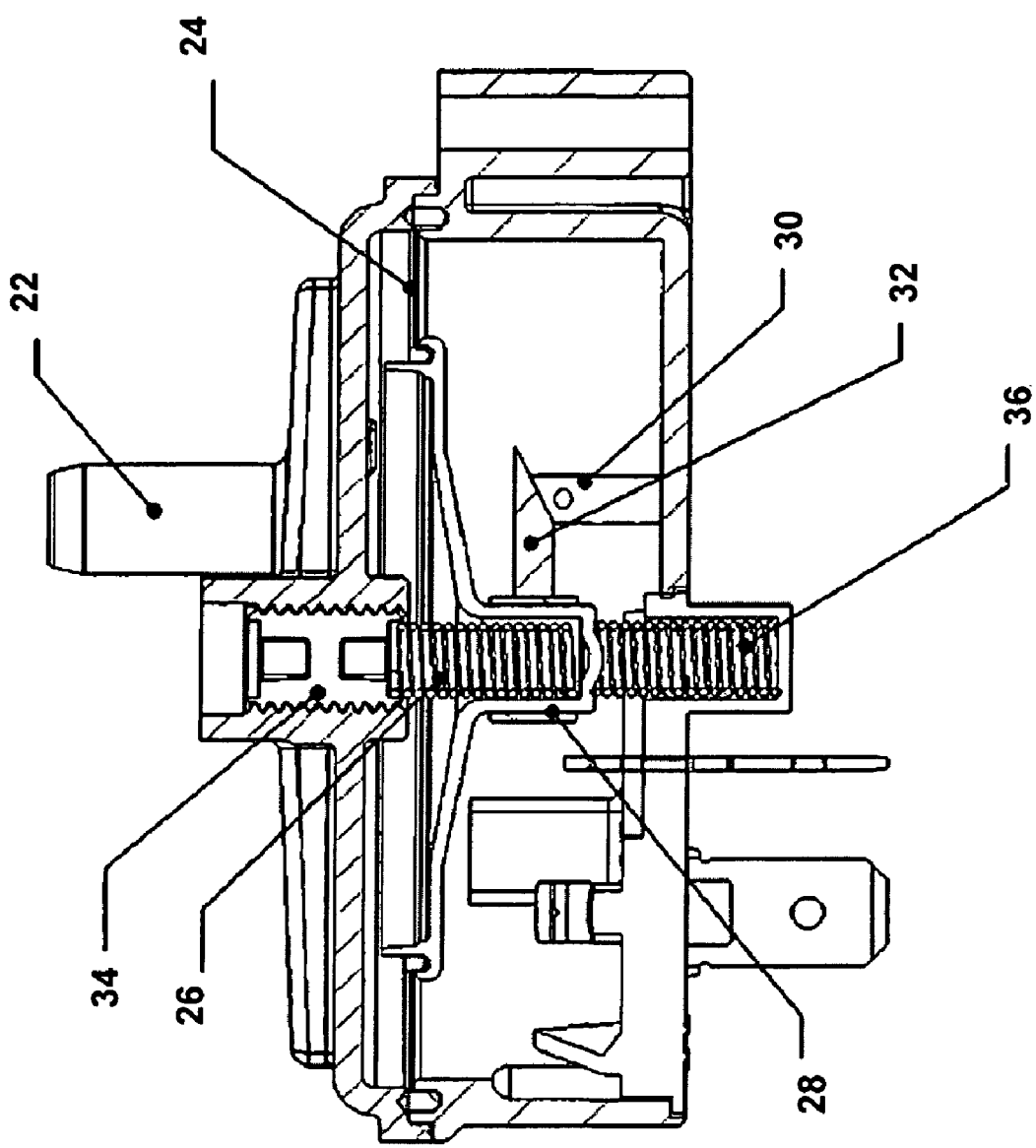
FIG. 2 is a cross-sectional view of a variable analog output pressure switch according to another example of the present disclosure.

FIGS. 1-3 show some preferred embodiments. However, it should be apparent that the present disclosure as directed to a pressure switch with optical mechanism, can include the following components. The optical mechanism includes a light source and light detector which are relatively positioned such that the light detector detects an amount of light from the light source. The switch also includes a pressure-responsive actuation device which causes a shutter device to translate (or rotate or otherwise move) gradually to a position in a light path between the light source and the light detector. As the shutter gradually enters the light path, the amount of light detected by the detector decreases. The detector provides an analog output varying according to the amount of light detected by the detector.

The above specific examples and embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A pressure switch comprising:
a diaphragm for detecting change in pressure;
a plunger coupled to said diaphragm, wherein said plunger is depressed due to an applied pressure on said diaphragm; and
a light source located on one side of said plunger and a photodetector located on an opposite side of said plunger to detect an amount of light from the light source,
wherein said switch provides an analog output varying according to the amount of light detected by said photodetector.

2. The pressure switch of claim 1, further comprising a shutter located on said plunger, wherein said shutter blocks light to the photodetector as said plunger is depressed.

3. The pressure switch of claim 1, wherein as said plunger is depressed, the plunger moves into an optical path between said light source and said photodetector, to serve as a shutter to reduce the amount of light to the photodetector.

4. The pressure switch of claim 1, further comprising a first spring abutting on an outer surface of said plunger, wherein when the pressure on said diaphragm decreases, the spring force of said first spring forces said plunger to return to an original, undepressed position.

5. The pressure switch of claim 4, further comprising a second spring abutting on an inner surface of said plunger, wherein said second spring applies a spring force against said plunger, said spring force of the second spring being adjustable by operating a threaded.

6. The pressure switch of claim 1, further comprising a spring abutting on an inner surface of said plunger, wherein said spring applies a spring force against said plunger adjustable by operating a threaded screw.

7. The pressure switch of claim 1, wherein said photodetector includes a photocell.

8. The pressure switch of claim 1, wherein said photodetector includes a phototransistor.

9. The pressure switch of claim 1 wherein said light source includes a light emitting diode.

10. A pressure switch comprising:
a light source and a photodetector relatively positioned such that said light detector detects an amount of light from said light source;
a diaphragm for detecting change in pressure;
a plunger coupled to said diaphragm, wherein said plunger is abutted on an outer surface by an actuator; and
a shutter located on said plunger,
wherein said shutter blocks the light from the light source to the photodetector as said plunger is depressed,
wherein said variable output pressure switch outputs voltage proportional to light detected by said photocell when said plunger is depressed due to an applied pressure on said diaphragm, and wherein said discrete switch outputs a binary signal when said plunger is completely depressed.

11. The pressure switch of claim 10, further comprising a discrete switch located within said variable analog output pressure switch, wherein said discrete switch outputs a binary signal when said plunger is completely depressed.

12. A pressure switch comprising:
   an optical mechanism including a light source and a light detector, said light source and light detector being relatively positioned such that said light detector detects an amount of light from said light source;
   a shutter; and
   a pressure-sensitive actuation device responding to pressure applied thereto to cause said shutter to move gradually from a first position not in a light path between said light source and light detector to a second position in said light path,
   wherein said detector provides an analog output varying according to the amount of light detected by said detector.

13. The pressure switch of claim 12, further comprising a mechanism for returning the shutter to said first position not in the light path between said light source and light detector, when said pressure to which said actuation device responded decreases.

* * * * *